United States Patent [19]

Wheetley

[11] Patent Number: 5,006,021
[45] Date of Patent: Apr. 9, 1991

[54] HIGH PRESSURE GAS DRILLING

[75] Inventor: Michael J. Wheetley, Bedford, Tex.

[73] Assignee: LTV, Dallas, Tex.

[21] Appl. No.: 272,109

[22] Filed: Nov. 16, 1988

[51] Int. Cl.⁵ .......................... B23B 35/00; B23B 51/06
[52] U.S. Cl. ...................................... 408/1 R; 408/56; 408/59
[58] Field of Search ...................... 408/1 R, 12, 56, 57, 408/58, 59, 61

[56] References Cited

U.S. PATENT DOCUMENTS

| | | | |
|---|---|---|---|
| 3,096,668 | 7/1963 | Maymard | 408/59 |
| 3,478,843 | 11/1969 | Eckardt | |
| 3,577,808 | 5/1971 | Visser | |
| 3,605,551 | 9/1971 | Steward | |
| 4,345,668 | 8/1982 | Gaunt | 408/59 |
| 4,396,317 | 8/1983 | Staron et al. | 408/59 |
| 4,449,865 | 5/1984 | Yankovoy et al. | 408/1 R |
| 4,563,924 | 1/1986 | Runkle et al. | |
| 4,573,836 | 3/1986 | Andersson | |
| 4,637,761 | 1/1987 | Murray et al. | |
| 4,640,652 | 2/1987 | Rivera, Jr. | |
| 4,688,970 | 8/1987 | Eckman | 408/12 |
| 4,745,557 | 5/1988 | Pekar et al. | 408/12 |

FOREIGN PATENT DOCUMENTS

| | | | |
|---|---|---|---|
| 3641190 | 7/1988 | Fed. Rep. of Germany | 408/56 |
| 5288 | 1/1979 | Japan | 408/56 |
| 58-22609 | 2/1983 | Japan | |

Primary Examiner—Daniel Howell
Attorney, Agent, or Firm—Charles S. Cotropia; James M. Cate

[57] ABSTRACT

High pressure gas cutting process useful for drilling large numbers of holes in large surface area workpieces such as air frame components and the like. The procedure utilizes a cutting tool which has an internal fluid passageway extending through the shank portion thereof and terminating in at least one discharge port adjacent a cutting edge of the tool. As the cutting tool is rotated and advanced into the workpiece in the course of the cutting operation, a high pressure gas is supplied into the cutting tool passageway under an applied pressure of at least 500 psia. The gas, which may be an inert gas such as nitrogen, is discharged from the cutting port into the tool with an expansive cooling effect. The gas then flows outwardly through the hole and exits the hole with sufficient velocity to entrain and remove the drill cuttings from the hole. A liquid lubricant can be employed to prolong the life of the cutting tool. The lubricant is present in such small portions as to avoid the buildup of an identifiable liquid phase within the hole. The cutting tool is operated at a cutting speed of at least 2,000 rpm and a penetration rate of no more than 1 mil per revolution of the tool.

26 Claims, 1 Drawing Sheet

HIGH PRESSURE GAS DRILLING

FIELD OF THE INVENTION

This invention relates to the high speed cutting of holes in workpieces such as air frame panels and the like and more particularly to such high speed cutting operations employing high pressure gas as a circulation fluid.

BACKGROUND OF THE INVENTION

In the manufacture of panels for use as air frame components in aircraft, space vehicles, missiles and the like it is commonly required that a large number of high precision holes be cut in a panel. The holes usually receive rivets, bolts or other fasteners to be used in fabrication. Oftentimes hundreds or even thousands of holes are cut in a workpiece at a given station. In order to form such holes, it is conventional practice to use high precision positive feed drilling devices which can be used to cut the holes rapidly, precisely and to a desired depth. Such drilling machines normally take the form of a drill head incorporating a positive feed threaded spindle which is used to both rotate and work and advance or retract a tool holder such as an arbor in which is secured a cutting tool such as a drill bit or reamer.

In order to dissipate heat and also remove cuttings from the work face at the confluence of the cutting tool and the workpiece, e.g. at the bottom of a hole being drilled by a drill bit, it is a conventional practice to employ a circulating fluid in conjunction with the cutting operation. The circulating fluid may be a gas or liquid and it may be applied to the work site through an attendant auxiliary nozzle or it may be applied to the work site through a supply passage extending through the cutting tool.

As noted previously, either gaseous or liquid circulating fluids can be used. In most highly repetitive cutting applications such as in the drilling of holes in air frame components, it has been the general practice to use a liquid circulating fluid. The use of a liquid provides for good cooling of the bit by heat transfer to the liquid medium as well as good lubrication. However, gasses have been used in some cutting operations and it has also been proposed use a gaseous cutting fluid in which a lubricant is incorporated into the gas to form a mist.

U.S. Pat. Nos. 3,478,843 to Eckhardt and 3,577,808 to Visser et al. disclose the supply of a mist of a coolant and lubricant under applied air pressure to a work site through a nozzle. For example, the patent to Visser discloses supplying a cutting fluid, a mixture of a lubricant and a coolant or refrigerant, e.g. "Freon", into a pressurized air stream which directed by a nozzle against the tip of a drill bit as it penetrates a workpiece. U.S. Pat. No. 3,605,551 to Steward discloses the use of an evaporative coolant such as alcohol, carbon tetrachloride, trichloroethylene, or trichlorotrifluorethane which is added to a commercially available cutting solution. The mixture is then applied under air pressure as a super coolant vapor mist to the confluence of the cutting tool and workpiece. Steward discloses high drilling speeds of 100 rpm.

U.S. Pat. No. 4,573,836 to Andersson discloses a rotary drill system in which the cutting tool is provided with an internal passage to which circulating fluid is supplied via a rotary swivel. The internal passageway terminates in two openings adjacent carbide cutting inserts at the end of the cutting tool. U.S. Pat. No. 4,640,652 discloses a cutting system in which a tap is provided with a central passageway for the circulation of coolant fluid.

The use of inert gases is disclosed in Japanese Patent 58-22609 and U.S. Pat. No. 4,563,924 to Runkle et al. In the Japanese patent, nitrogen gas under a pressure of 5 kg/cm$^2$ (about 70 psi) is supplied to a core cutter. The core cutter is said to be cooled to a temperature of $-20°$ to $+20°$ C. The patent to Runkle et al discloses a procedure for reducing the oxygen concentration at the confluence of a nonoxide ceramic cutting tool and a workpiece by supplying concentric annular curtains of inert gas to the work face. The oxygen concentration in the work zone is reduced to 10% or less of ambient oxygen.

SUMMARY OF THE INVENTION

In accordance with the present invention, there is provided a new and advantageous cutting process which can be used to cut large numbers of holes in large surface area workpieces such as air frame components and the like. The invention utilizes a cutting tool which has an internal fluid passageway extending through the shank portion thereof and terminating in at least one discharge port adjacent a cutting edge of the tool. In carrying out the invention as the cutting tool is rotated and advanced into the workpiece in the course of the cutting operation, a high pressure gas is supplied into the cutting tool passageway under an applied pressure of at least 500 psia. The gas, which preferably is an inert gas such as nitrogen, is discharged from the cutting port into the tool with an expansive cooling effect. The gas then flows outwardly through the hole and exits the hole with sufficient velocity to entrain and remove the drill cuttings from the hole.

Preferably, the gaseous circulation fluid contains a minor amount of a liquid lubricant which acts to lubricate the sliding surface contact between the cutting edge of the cutting tool and the work site, thus prolonging the life of the cutting tool. The lubricant is present in such small portions as to avoid the buildup of an identifiable liquid phase within the hole. Preferably, the cutting tool is operated at a cutting (rotational) speed of at least 2000 rpm and the penetration rate of the tool is no more than 1 mil per revolution of the tool.

In a further aspect of the invention, there is provided a system for the high speed cutting of precision holes in workpieces of the type described above. The system comprises a drill head which includes a tool holder having a fluid passageway therein. The drill head comprises means for advancing retracting and rotating the tool holder relative to the workpiece. A cutting tool is secured in the tool holder. The cutting tool has a fluid passageway communicating with the passageway within the tool holder and extending through the shank portion of the cutting tool to a discharge port in the vicinity of the cutting edge of the cutting tool. The system further comprises a source of gas at a pressure of at least 500 psia and means connecting the gas source to the drill head for supplying high pressure gas to the tool holder fluid passage and thence to the cutting tool. The system also comprises a source of a liquid lubricant and means for supplying a small amount of liquid lubricant to the high pressure gas stream prior to introduction of the high pressure gas into the tool holder passageway. Preferably, the cutting tool comprises diametrically opposed flutes extending along the cutting tool. Two diametrically opposed discharge ports in the cutting tool passageway are located between the flutes.

DETAILED DESCRIPTION

Figure 1:
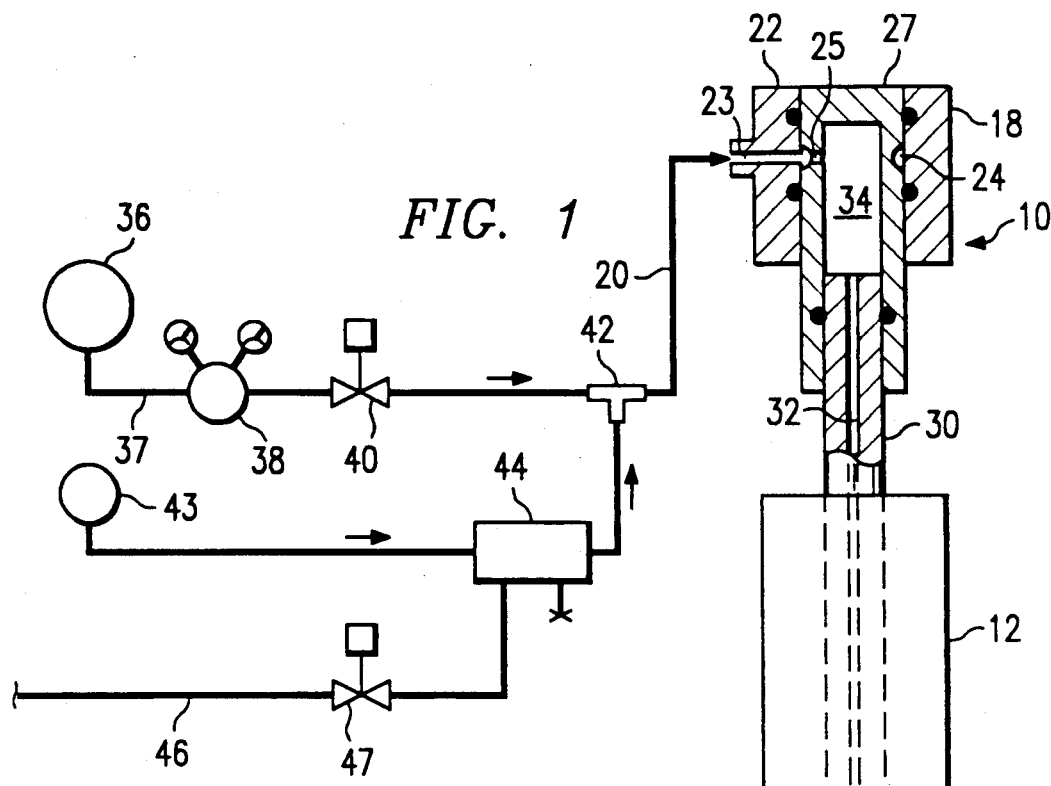
FIG. 1 is a schematic illustration partly in section showing a system for supplying gas and lubricant under high pressure to a drill head provided with a cutting tool for use in high speed drilling.

In cutting holes in high strength materials used in air frame components, it is conventional to drill the holes using several cutting passes. In a first pass a relatively small diameter hole is drilled. This is followed by one or more additional passes in which the hole is reamed out and finished to its final dimension. Subsequent to the reaming operation, the hole can be beveled at its surface with a countersink drill. In carrying out such operations over wide surface areas, with a large number of holes at spaced intervals being provided over the surface at a single station, it is conventional to supply a liquid coolant to the drilling operation in order to avoid burning up the cutting tool. The liquid coolant can be supplied in one or two ways. In one case it is used to simply flood the surface being worked; in another approach, the liquid coolant is directed through a passage in the cutting tool to the tip of the tool. The cutting speed in such operations typically is less than 1,000 rpm, normally on the order of about 500 rpm or less. In such operations, the cutting tool is usually advanced at a feed rate of about 3 to $5 \times 10^{-3}$ inches per revolution (ipr).

In the present invention, gas instead of liquid is used. The gas is supplied through the cutting tool at a pressure of at least 500 psia and preferably at least 700 psia. As the gas is discharged from the cutting tool into the hole, the substantial pressure drop as it exits the discharge ports exerts a significant cooling effect. This together with convective heat transfer by passage of the gas past the cutting face, avoids excessive heat build up, not withstanding the lack of a liquid heat transfer medium. In addition, the gas issues from the hole at sufficient velocity to entrain the drill cuttings and removing them from the hole as they are produced, thus avoiding an accumulation of drill cuttings in the hole.

In order to avoid the formation of large drill cuttings and to facilitate cuttings removal, the incremental advance of the drill bit per revolution is substantially less than in the prior art processes. In the present invention, the drill bit preferably is advanced about 1 mil per revolution (0.001 IPR) or less and, more desirably, at a rate of no more than ½ mil per revolution. While this incremental rate of advance is substantially below that of the prior art, the time within which a hole can be drilled to a given depth is usually no greater and sometimes less than for prior art practices because of the much higher rotational speed of the cutting tool. In addition, as described in greater detail hereinafter, the hole can be drilled in a single pass rather than the several passes involved in the typical prior art processes.

The present invention is particularly well suited to the use of a cutting tool in a robotic drilling system to provide a large number of holes in a large three dimensional workpiece such as an aircraft wing section or fuselage section or the like. In this application, the head assembly of the drilling mechanism is employed in a robot system in which the drill head can be moved three-dimensionally through an orthogonal axis system and then brought to an orientation perpendicular to the workpiece surface before the cutting operation is commenced. A suitable robotic drilling system in which the invention may be employed is disclosed in U.S. Pat. No. 4,637,761 issued Jan. 20, 1987 to Murray et al entitled "Automated Tool Positioning System." For further description of a such robotic drilling system, attention is invited to U.S. Pat. No. 4,637,761, the entire disclosure of which is incorporated herein by reference.

The invention is particularly useful in layered composited panels where the drilling rate of penetration and drilling speed may be varied as the cutting tool progresses through each layer. For example, one form of composited panel to which the invention can be advantageously applied comprises successive layers of a graphite composite and titanium and aluminum alloys. A relatively high drilling speed can be employed initially in the graphite layer, with the speed being reduced when the cutting tool penetrates the titanium layer and thereafter increased when it penetrates the aluminum layer. The present invention is particularly well suited to this mode of operation involving a robotic drilling system which functions over a wide three dimensional work area. In addition, since gas instead of liquid coolant is used, and the liquid lubricant, if employed, is used in very small amounts, there is no massive accumulation of liquid, thus avoiding the need for a liquid collection sump as is required in the normal prior art operation in which a liquid coolant is used and recycled.

Turning now to the drawings, FIG. 1 illustrates a preferred embodiment of the invention in which minor amounts of a liquid lubricant are entrained in the high pressure gas stream supplied to the drilling tool. As shown in FIG. 1, as illustrated a system for supplying is illustrated a drill head 10 in which a motor and positive feed spindle mechanism 12, indicated schematically, is employed to rotate and advance or retract a tool holder 14 in which a cutting tool 16 is secured. The drill head is equipped with a swivel 18 which provides a rotating union for applying fluid to the drill head. As illustrated, fluid via line 20 enters the stationary swivel casing 22 where it flows through passageway 23 and annular recess 24 and radial passage 25 in a swivel journal 27. A draw bar 30 to which the tool holder 14 is secured is slidably secured with journal 27 and keyed to the journal for rotational movement therewith. The draw bar 30 is provided with a fluid passageway 32 opening to the interior 34 of the swivel journal and which is in fluid communication with the passage within the cutting tool as described below.

High pressure gas, preferably an inert gas such as nitrogen, is supplied from a suitable high pressure source 36, e.g., a 3000 psi surge tank via line 37 to a pressure regulator 38 where the pressure is reduced to the desired level. Pressure regulator 38, for example, may be of the variable pressure type to provide for a controlled pressure which can be varied from 500 to 1,000 psi depending upon the drilling operations as described herein. High pressure gas is supplied through an off-on valve 40 to a T union 42 where it is admixed with lubricant. A lubricant such as an aqueous base or oil base liquid is supplied from a reservoir 43 under gravity or pressurized feed to a pneumatic high pressure positive displacement pump 44. Pump 44 is actuated by air pressure supplied via line 46 from a low pressure source, shop air of a pressure of about 80 psi, through a valve 47 to the pneumatic actuating side of the pump. The pump may be adjustable to provide for variable volume control. Usually, only very small amounts of lubricant are used. For example, when operating at an air pressure of 750 psi, the lubricant rate may be supplied to union 42 at a rate within the range of about 0.3 to about 1 cc per minute. The high pressure gas with the entrained lubricant is supplied via line 20 to the swivel union 18 and then supplied to the cutting tool 16.

The amount of lubricant added to the high pressure gas can be regulated simply by visually observing the effluent issuing from the hole being drilled in the workpiece. Lubricant can be adjusted to the point where a visual fog starts to occur then reduce slightly from that point in order to avoid the undesired accumulation of liquid lubricant. In terms of the amount of lubricant supplied per standard cubic feet (scfm) of gas the lubricant feed rate can be kept to no more than 0.5 cc per scfm of gas and more preferably no more than 0.3 cc per scfm of gas in order to avoid liquid accumulations. The lower rate of 0.3 cc per scfm is adequate in terms of providing sufficient lubricant to avoid heat build up due to friction, and as a practical matter, there will be no need to exceed this level.

It is to be recognized that the drill head 10 including the spindle and motor assembly 12, tool holder 14 and the swivel 18 can be of any suitable type and can be assembled from commercially available components. By way of example, a suitable drill head can be provided employing a three horsepower 10,000 rpm integral spinde, available from Setco, Inc. as part number 16103-100mlcy, equipped with a ¼ inch NPT rotary coolant union e.g. such as available from Dublen, Inc. and a standard No. 30 tool holder.

Figure 3:
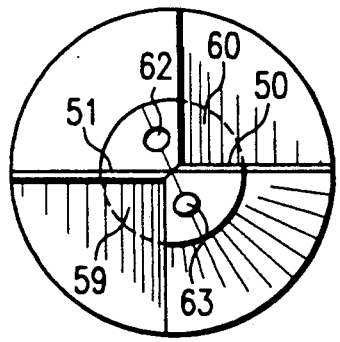
FIG. 3 is an end view of the tip of the cutting tool of FIG. 2.
Figure 2:
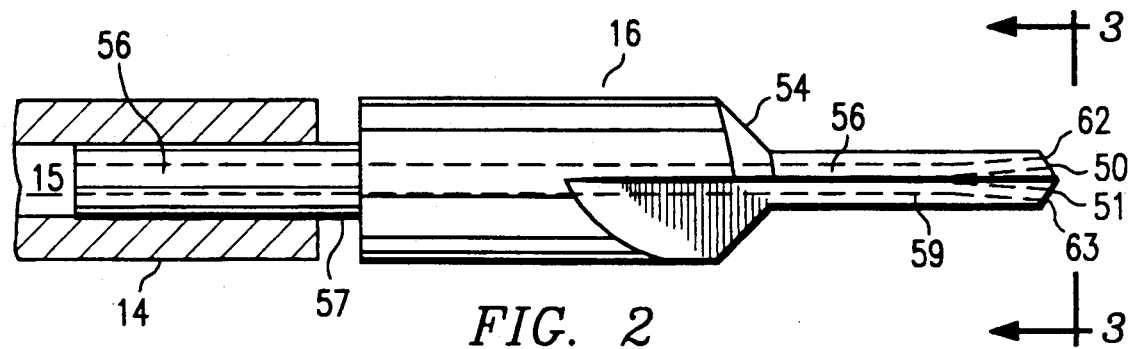
FIG. 2 is an illustration partly in section of a preferred form of cutting tool which can be used for single pass drilling and countersinking of holes in high strength composite workpieces.

FIG. 2 illustrates a preferred form of cutting tool for use in the present invention. The cutting tool comprises a straight-fluted drag-type bit having divergent cutting edges 50 and 51 typically providing a drill diameter within the range of about 3/16 to ⅜ inch. The cutting tool is equipped with a countersink shoulder 54 which enables the hole to be cut and the hole opening flared in a single operation. The countersink shoulder normally would have a diameter of ⅜ inch in the case of a 3/16 inch cutting tip (to cut a maximum countersink diameter of 0.39 inches) and about 1 inch in the case of a ⅜ inch cutting tip (to cut a maximum countersink diameter of about 0.76 inches). The cutting tool is secured in the tool holder 14 of the drill head and is provided with a longitudinal passage 56 extending through the tool shank 57 and to the cutting tip. Passage 56 is, of course, in fluid communication with the passage 15 within the tool holder 14 and the passage 32 extending through the draw bar up to the swivel head. In the embodiment illustrated, the tip of the cutting tool is provided with two diverging cutting blades 50 and 51 which may be provided by hardened inserts such as carbide or polycrystalline diamond (PCD) inserts. Parallel flutes 59 and 60 are provided in the drill portion of the cutting tool at diametrically opposed locations as indicated in FIG. 2 and also in FIG. 3 which is an end view of the cutting tool of FIG. 2. The tip of the cutting tool is provided with discharge ports 62 and 63 through which the high pressure gas emerges from the cutting tool. The discharge ports are at diametrically opposed locations intermediate the longitudinal flutes. The high pressure gas emanating from the discharge ports flows directly into the flutes so that the drill cuttings are immediately forced from the hole. As shown in FIG. 3, viewed from the tip of the cutting tool, the tool rotates in a counterclockwise direction. Gas emanating from port 62 entrains cuttings produced by cutting blade 50 forcing the cuttings up the fluted channel 60. Gas emanating from discharge port 63 similarly entrains cuttings produced by blade 51 to force these cuttings up the fluted channel 59.

The liquid lubricant entrained in the high pressure gas supply functions to provide a liquid lubricated film interface between the cutting edges of the tool and the workpiece in order to reduce friction. The use of the lubricant materially increases bit life and in the sense of reducing the friction between the bit and the workpiece acts to alleviate heat buildup. However, the lubricant is not relied upon as a coolant to dissipate heat. This is accomplished surprisingly enough solely by the circulating gas. Cooling results not only from convection but also from the rapid reduction in pressure as the gas exits through the discharge ports. When drilling through titanium at speeds of 3000 rpm, the temperature at the work face can actually be reduced to below room temperature through the expansive and convective action of the coolant gas.

Any suitable lubricant can be employed in carrying out the invention. Aqueous base or oil base lubricants can be used. A suitable lubricant has been found to be a vegetable-oil based lubricant available from Boeing Aircraft Company under the designation Boelube.

The use of an inert gas such as nitrogen is particularly advantageous where the workpiece undergoing drilling is formed of titanium. Titanium is a poor heat conductor and therefore heats up readily when subjected to drilling or other cutting action and when heated readily undergoes oxidation. The use of an inert gas such as nitrogen provides a substantially nonoxidative environment in the hole, and thus avoids or greatly reduces oxidation of the titanium.

Cutting speeds and incremental penetration rates will be addressed below for specific applications. In general, the harder the material, the lower the cutting speed and also the smaller the incremental advance of the cutting tool per revolution. For a given material, the cutting speed will decrease somewhat as the cutting tool diameter sizes increases. Gas pressure can also be decreased as the bit diameter increases since the larger cutting tools will permit the use of larger gas discharge ports.

In general, in cutting a hole in a hard, difficult-to-machine diameter material such as titanium or other hard materials, the cutting rate will proceed at speeds within the range of about 2,000–4,000 rpm. The cutting speed normally will fall within the range of about 2,000–3,000 rpm for the larger size bits of about 5/16 inch or ⅜ inch in diameter and at speeds of about 3,000–4,000 rpms for the smaller size bits, of about 3/16 or ¼ inch in diameter. In this instance, the incremental penetration rate preferably will be no more than ½ mil per revolution and more preferably on the order of about ¼ mil per revolution.

For softer materials such as aluminum and graphite, the drill speed will range from about 4,000 to about 10,000 rpm or more preferably from about 5,000 to about 8,000 rpms. As in the case of the harder materials, the lower speeds will be used for the larger bit sizes and the higher speeds for the smaller bit sizes. For the softer materials, the incremental penetration rate will be about 1 mil or less and more preferably about ½ mil.

Heat conductivity of the material being drilled also has an impact upon drilling speed. For example, hardened steel which can have hardness equal to or even greater than titanium is a better heat conductor than titanium and thus can be drilled at a somewhat higher rate than titanium.

As indicated above, the gas pressures employed in carrying out the invention will depend somewhat on the size of the cutting tool and the size of the gas discharge ports. For a 3/16" cutting tool provided with two 1/32" diameter discharge ports, the gas supplied to the swivel should be at a pressure of at least 700 psia and typically may range from about 750-1000 psia. In this case, the cutting tool may be rotated at speeds ranging from about 3000 rpm in titanium up to about 8000 rpm in graphite and aluminum. Higher rotational cutting speeds may be used although there is little advantage in doing so. The penetration rate, as noted previously, is preferably no more than about 1 mil per revolution. More preferably, in the case of lower speeds and a material such as titanium, the penetration rate will be on the order of about ¼ mil per revolution or less and for the softer materials such as graphite or aluminum, the penetration rate should be about ½ mil per revolution.

When using a larger size cutting tool such as a ⅜" diameter cutting tool, the discharge ports will have a diameter of about 3/64" and the pressure of the gas supplied to the swivel can be lowered somewhat to about 500 psia. However, higher pressures can be used as noted previously, and in many cases it will be advantageous to employ pressures of about 700 psia or even higher up to about 1000 psia or more. In using the larger size bit, it will usually be desirable to reduce the drilling speed somewhat. For a ⅜" bit in titanium the drilling speed can be reduced to about 2000-2500 rpm. In graphite or aluminum, a drilling speed of about 5000 rpm can be used. These represent optimum or near optimum values, and as noted above, higher drilling speeds can be used, although without any added advantage. As described above, the penetration rate should normally be on the order of 1 mil per revolution or less, preferably about ¼ mil for the harder titanium material and about ½ mil for the softer material such as graphite or aluminum.

As noted previously, a preferred application of the invention is in cutting holes in composite workpieces having two or more layers of different hardnesses and machineabilities and the above relationships can be employed to control the cutting speed and penetration rate from one layer to the next. For example, in a composite structure comprising graphite/epoxy attached to a titanium substrate which in turn is attached to an aluminum substrate, the initial graphite layer can be drilled at a speed of 8,000 rpm and a penetration rate of ½ mil. When the titanium layer is encountered, the cutting rate and penetration rate can be reduced to about 3,000 rpm and ¼ mil per revolution respectively and thereafter increased to the initial values when the aluminum layer is encountered.

Having described specific embodiments of the present invention, it will be understood that modifications thereof may be suggested to those skilled in the art, and it is intended to cover all such modifications as fall within the scope of the appended claims.

I claim:

1. In a method of forming a hole in a workpiece with a cutting tool having a cutting edge and a shank portion having a fluid passageway therein and at least one discharge port extending from said fluid passageway to the exterior of said cutting tool in the vicinity of said cutting edge, the method comprising the steps of:
   rotating said cutting tool and advancing said cutting tool into said workpiece to cut a hole therein; and
   supplying a circulation fluid comprised of gas having a liquid lubricant entrained therein into said passageway under an applied pressure of at least 500 psia to cause said circulation fluid to be discharged from said cutting port into said hole with an expansive cooling effect and outwardly from said hole to the entrance thereof to remove drill cuttings from said hole.

2. The method of claim 1 wherein said workpiece includes titanium and said gas is an inert non-oxidizing gas.

3. The method of claim 2 wherein said gas is nitrogen.

4. The method of claim 1 wherein said cutting tool is rotated at a rate of at least 2,000 rpm.

5. The method of claim 4 wherein said cutting tool is advanced into said workpiece at an incremental penetration rate of no more than 1 mil per revolution of said cutting tool.

6. The method of claim 4 wherein said cutting tool is advanced into said workpiece at an incremental penetration rate of no more than 0.5 mil per revolution of said cutting piece.

7. The method of claim 1 wherein said lubricant is entrained in said gas in an amount no greater than 0.5 cc/scfm.

8. The method of claim 1 wherein said lubricant is entrained in said gas in an amount of no more than 0.3 cc/scfm.

9. The method of claim 1 wherein said liquid lubricant is incorporated into said gas in an amount less than that sufficient to cause a liquid phase/air suspension in the effluent from the hole in said workpiece.

10. The method of claim 1 wherein said cutting tool is rotated at a speed within the range of 2,000-4,000 rpm and said cutting tool is advanced into said workpiece at an incremental penetration rate of no more than ½ mil per revolution.

11. The method of claim 10 wherein said cutting tool is advanced into said workpiece at a rate of about ¼ mil per revolution.

12. The method of claim 1 wherein said cutting tool is rotated at a speed within the range of 4,000-10,000 rpm and said cutting tool is advanced into said workpiece at an incremental penetration rate of no more than 1 mil per revolution.

13. The method of claim 12 wherein said cutting tool is advanced into said workpiece at a rate of about ½ mil per revolution.

14. In a method of forming a hole in a workpiece with a cutting tool having a cutting edge and a shank portion having a fluid passageway therein and at least one discharge port extending from said fluid passageway to the exterior of said cutting tool in the vicinity of said cutting edge, the method comprising the steps of:
   rotating said cutting tool at a rate of at least 2,000 rpm and advancing said cutting tool into said workpiece;
   supplying a gas under a pressure of at least 500 psia into the fluid passageway of said cutting tool; and discharging said gas through said port with an expansive cooling effect while flowing said gas outwardly through said hole to the entrance of said hole under sufficient velocity to entrain cuttings in said gas and remove said cuttings from said hole.

15. The method of claim 14 wherein said cutting tool is advanced into said workpiece at an incremental penetration rate of no more than 1 mil per revolution of said cutting tool.

16. The method of claim 14 wherein said cutting tool is advanced into said workpiece at an incremental penetration rate of no more than ½ mil per revolution of said cutting piece.

17. The method of claim 14 wherein said cutting tool is rotated at a speed within the range of 2,000–4,000 rpm and said cutting tool is advanced to said workpiece at an incremental penetration rate of no more than ½ mil per revolution.

18. The method of claim 17 wherein said cutting tool is advanced into said workpiece at a rate of about ¼ mil per revolution.

19. The method of claim 14 wherein said cutting tool is rotated at a speed within the range of 4,000–10,000 rpm and said cutting tool is advanced into said workpiece at an incremental penetration rate of no more than 1 mil per revolution.

20. The method of claim 19 wherein said cutting tool is advanced into said workpiece at a rate of about ½ mil per revolution.

21. The method of claim 14 further comprising the step of entraining a lubricating liquid in said high pressure gas, said liquid being in a minor amount relative to said gas flow to avoid accumulation of a separate liquid phase within said hole.

22. The method of claim 21 wherein said lubricant is entrained in said gas in an amount no greater than 0.5 cc/scfm.

23. The method of claim 21 wherein lubricant is entrained in said gas in an amount of no more than 0.3 cc/scfm.

24. The method of claim 21 wherein said liquid lubricant is incorporated into said gas in an amount less than that sufficient to cause a liquid phase/air suspension in the effluent from the hole in said workpiece.

25. The method of claim 14 wherein said workpiece comprises a composite of layers of varying hardness, comprising operating said cutting tool at a designated cutting speed and incremental penetration rate in a relatively soft layer of said composite and operating said cutting tool in a relative hard layer at a reduced cutting speed relative to said designated cutting speed and a reduced incremental penetration rate relative to said designated incremental penetration rate.

26. The method of claim 25 wherein said designated cutting speed is within the range of 4,000–10,000 rpm and said designated incremental penetration rate is no more than 1 mil per revolution and said reduced cutting speed in the relative hard layer is within the range of 2,000–4,000 rpm and said incremental penetration rate in said relatively hard layer is no more than ½ mil per revolution.

* * * * *